Jan. 16, 1940.  E. J. DUNHAM  2,187,197
INDUSTRIAL TRUCK
Original Filed Dec. 11, 1937    3 Sheets—Sheet 1

INVENTOR.
ELMER J. DUNHAM.
BY Walter E. Schirmer
ATTORNEY.

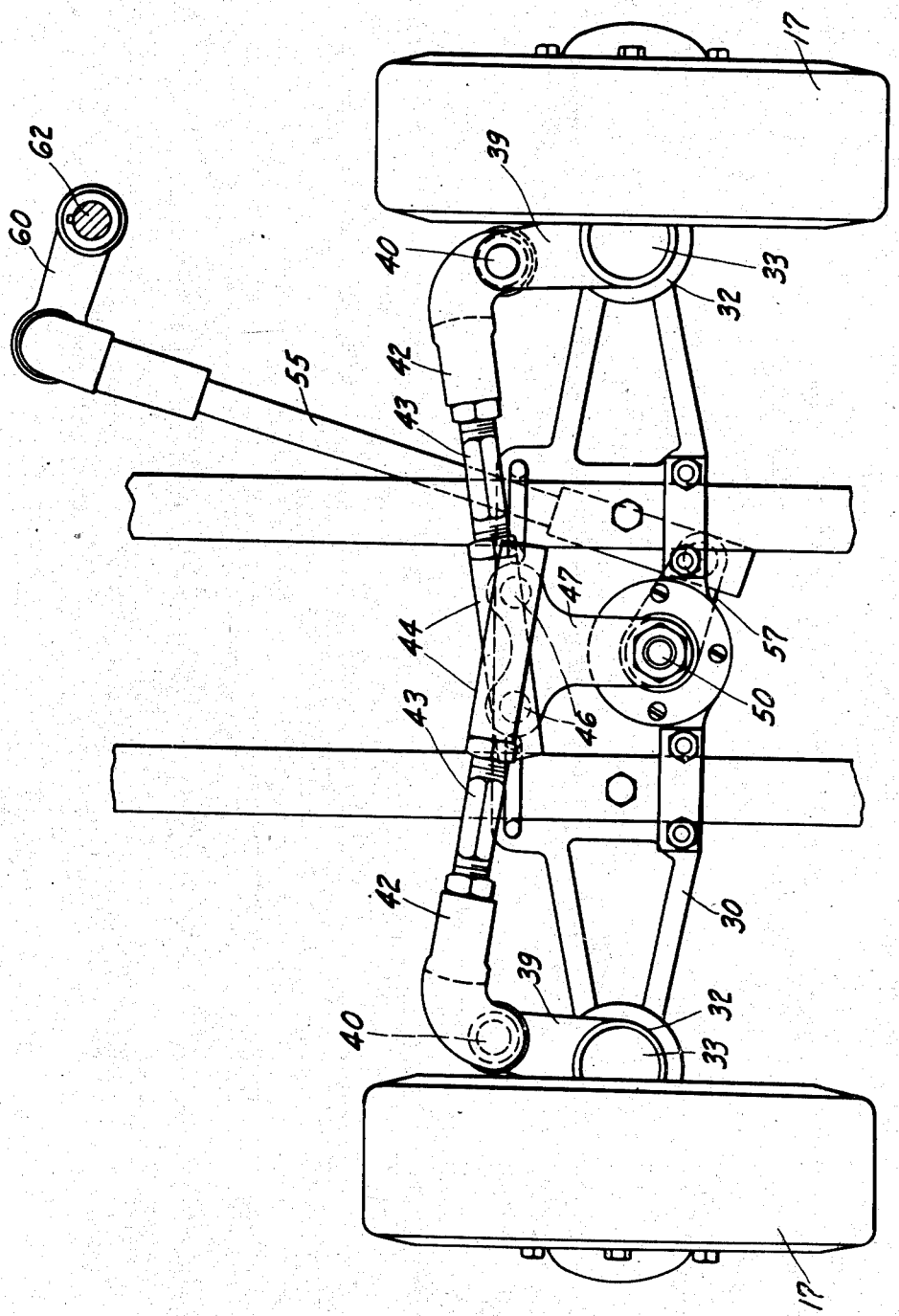

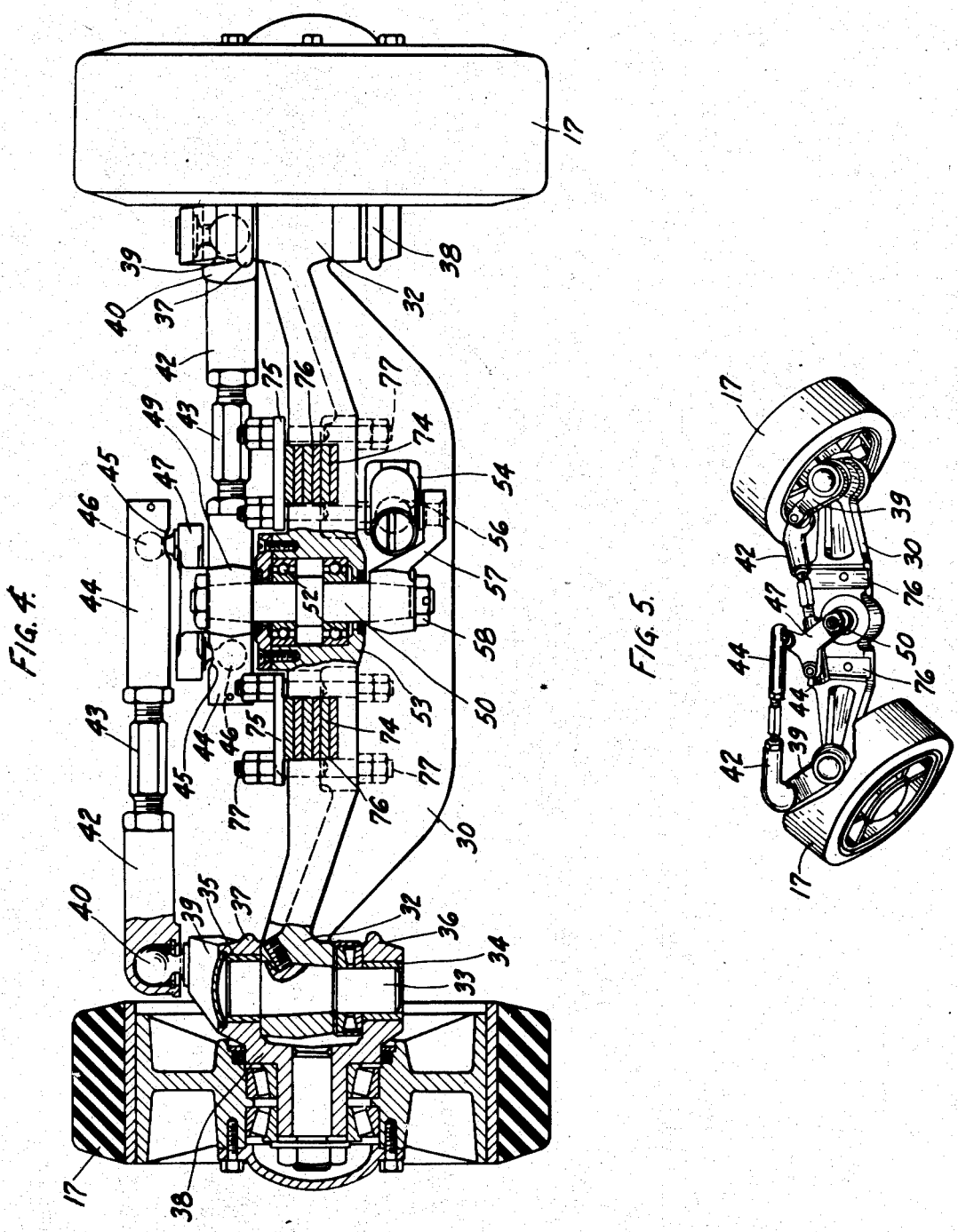

Patented Jan. 16, 1940

2,187,197

UNITED STATES PATENT OFFICE 2,187,197

INDUSTRIAL TRUCK

Elmer J. Dunham, Battle Creek, Mich., assignor to Clark Equipment Company, Buchanan, Mich., a corporation of Michigan Original application December 11, 1937, Serial No. 179,273. Divided and this application December 10, 1938, Serial No. 244,945

4 Claims. (Cl. 280—96.2)

This invention relates to industrial trucks, and more particularly is directed to an industrial truck utilized for transporting, tiering, and storing goods, wares and merchandise in warehouses, docks, manufacturing plants and the like.

The present application is a division of my copending application, Serial No. 179,273, filed December 11, 1937, now Patent No. 2,178,367, October 31, 1939, and is directed particularly to the steering axle construction utilized in such trucks.

In the preferred form of the present invention there is disclosed a gasoline powered tractor or truck unit which is capable of rendering continuous service without the necessity of charging batteries or the like, and which preferably employs hydraulic mechanism for raising and lowering the load supporting means.

The present truck is of the type having a pair of uprights at the forward end thereof upon which is mounted a load-supporting carriage which may be moved vertically with respect to the uprights for picking up and transporting various types of material. The power unit for the truck is mounted rearwardly of the uprights and has power transmitting means connected to the front axle for supplying the motive power to the truck. The operator stands on a platform rearwardly of the power unit and controls the operation of the unit from this point. The power plant itself is located above a pair of dirigibly mounted steering wheels which support the rear end of the frame, and which form the subject matter of the present application.

I have found that the placing of the drive wheels at the forward end of the frame adjacent the load-supporting uprights serves to increase the tractive power of the unit, and also assists in controlling the movements of the unit when under full load. This arrangement also enables the uprights to be secured to the axle housing enclosing the drive transmitting means in such a manner that it may be removed with facility for repair or replacement of the upright structure or the load supporting means without necessitating the dismantling of any portion of the frame or chassis of the vehicle. Thus, possible damage or breakage of any of the tiering mechanism requires only the replacement of such mechanism without in any manner affecting the frame or power unit of the vehicle.

Preferably, the dirigible steering wheels are located at the rear of the truck beneath the power unit, thereby facilitating steering action at slow speeds under full load, and also allowing for close operations and for moving of the truck into positions such that the load can be discharged from a center aisle to machines or storing bins without requiring the truck to be moved completely out of the aisle.

Another distinct advantage arising from this location of the steering means resides in the ability to obtain a greater turning angle, thus reducing the turning radius of the truck without any loss of tractive effort. Thus the truck is able to turn intersecting aisles which have a width less than the actual turning radius of the truck itself.

A further feature of the present invention resides in the provision of a construction for turning the dirigible steering wheels so that the geometry of the turning movement is properly calculated to produce the proper angular relationship between the wheels so that they turn about a center, positioned at a point just laterally off the side of one of the front wheels of the truck. This steering connection includes a center mounting from which connections are established to each of the king pins supporting the dirigible wheels. A suitable connection from the steering mechanism to the center pin serves to transmit the turning force to these connections.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 3 is a top plan view of the dirigible steering means of the vehicle;

Figure 4 is a front elevational view partly in section of the steering mechanism shown in Figure 3; and Figure 5 is a perspective view of the steering mechanism in one of its operating positions.

Figure 1:
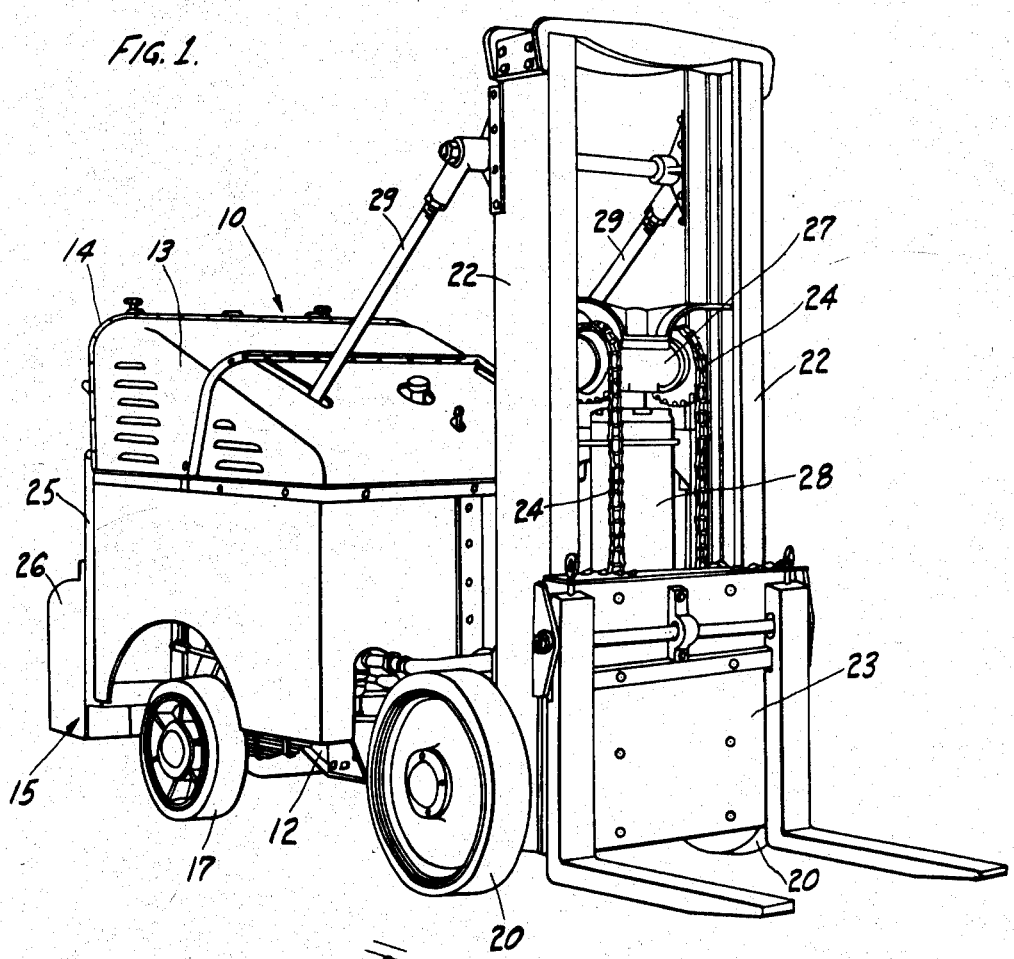
Figure 1 is a perspective view of the truck unit with the load supporting means in lowered position.

Referring now in detail to the drawings, I have provided a truck unit, indicated generally at 10, having a power unit comprising an internal combustion engine or the like mounted on the rear portion 12 of the frame of the unit and enclosed within a suitable hood 13.

Rearwardly of the hood 13 is an instrument panel 14 carrying the various control devices for the unit, and at the base of this panel is a rearwardly extending platform 15 upon which the operator is adapted to stand. Mounted beneath the power unit in the hood 13 and supporting the rear end of the frame are the dirigibly mounted steering wheels 17. Preferably, the platform 15 for the operator has a relatively heavy counterweight portion 25 bolted to the rear of the hood and including rearwardly curved side members 26 formed of cast metal or the like and of heavy section which serve as suitable counterweight means, and in addition, afford protection for the operator against injury due to contact with stationary objects.

The frame itself is of the locomotive type and has an upwardly arched rear portion which accommodates the axle assembly and steering mechanism for the wheels 17. This mechanism is shown more in detail in Figures 3 to 5, inclusive.

Forwardly of the hood 13 there is provided a front axle including the driving wheels 20, this axle being of the construction shown in my above-mentioned copending application upon which are supported the uprights 22 which carry the load-supporting carriage 23. This carriage is guided within the uprights and is controlled in its vertical movement by means of the chains 24 mounted over the cross head 27, which is controlled by a piston extending within the hydraulic cylinder 28. The uprights are supported in position by means of the extending arms 29 secured to the rear face of the uprights adjacent the top thereof and preferably trunnioned for movement at the sides of the rear portion of the frame 12. The details of the lifting mechanism and the control therefor are all described in detail in my copending application, and it is not believed necessary to consider the same herein.

Considering now the rear axle assembly, this assembly comprises a transverse axle 30 which is provided at its opposite ends with spindle receiving portions 32 adapted to receive the spindles 33, as shown in Figure 4, which have a tapered fit in the portions 32 and which at their opposite ends are received in suitable bearing sleeves 34 and 35 carried by the trunnions 36 and 37 of the wheel spindles 38.

The upper trunnion 37 of each of the wheel spindles 38 has a rearwardly extending portion 39 in the form of a crank or the like which, at its outer end, is provided with a ball and socket connection 40 to the connecting member 42. The opposite end of the member 42 is connected through turnbuckle couplings 43 to a suitable connection member 44 having a socket portion 45 adapted to receive the ball 46 carried by the T-shaped crank arm 47.

The crank arm 47 carries the two ball members 46 extending in opposite directions from opposite ends of the head portion thereof whereby both of the wheel spindles are connected to these ball members 46 in overlapping relation, as clearly shown in Figure 4. The crank arm 47 being T-shaped in form at the lower end of the shank thereof is provided with a collar portion 49 secured to the pin 50 carried in suitable bearings 52 disposed in the center bearing support 53 of the axle 30.

The axle 30 is also provided with an apertured portion 54 through which extends an actuating rod 55 connected at one end by means of the ball and socket connection 56 to a crank arm 57 carried at the lower end of the pin 50 and secured thereto by means of a suitable key and nut 58. The opposite end of the rod 55 is connected in any suitable manner to a crank arm 60 secured for conjoint rotation with a shaft 62 extending vertically upwardly of the truck at one side of the power unit just forwardly of the instrument panel 14. At its upper end the shaft 62 is adapted to be connected through suitable reduction gearing to a steering wheel shaft carrying a suitable steering wheel projecting through the instrument panel 14 rearwardly for control by the operator standing on the platform 15. Rotation of the steering wheel effects through the reduction gearing a corresponding rotation of the shaft 62 which in turn rotates the crank 60.

It is to be understood that in case of lift trucks having the operator placed between the uprights and power plant, as shown in my copending application, Serial No. D-80,075, filed September 24, 1938, now Design Patent No. 113,259, issued February 7, 1939, the rod 55 may be connected to a suitable drag link arm adjacent the uprights and controlled from any suitable steering shaft arrangement.

Rotation of the crank 60 in turn imparts longitudinal movement to the rod 55, thereby rotating the crank 57 and thus effecting rotation of the pin 50. The rotation imparted to the pin 50 results in a corresponding swinging movement of the crank plate 47 which produces longitudinal movement of the members 44, and consequently of the associated members 42 for rotating the arms 39 about the pins 33 as a center. This in turn produces rotation of the wheel spindles 38 in the same direction about the pins 33 to produce the desired turning movement of the wheels 17.

Figure 2:
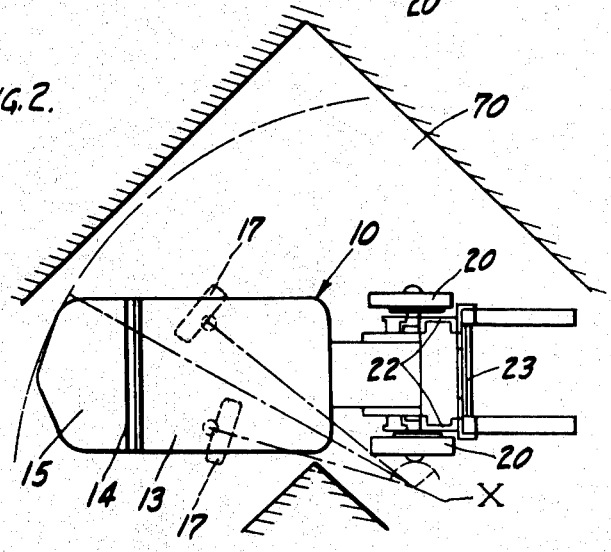
Figure 2 is a diagrammatic view illustrating the turning radius available with a unit of this type.

It will be noted that by reason of the overlapping arrangement of the ports 44 of the steering arms and the relationship of the balls 46 with respect to the axis of rotation of the plate 47, a differential steering movement is provided which results in conjoint turning movement of the wheels 17, as shown diagrammatically in Figure 2. This differential movement causes the inside wheel to turn through a greater arc than the outside wheel of the truck, and consequently produces a sharper turning angle than could be provided by the conventional steering mechanism in which the two steering spindles are cross connected in the customary manner.

This steering action is under the direct control of the operator standing upon the platform 15 so that he may guide the vehicle through the aisles and around corners with the greatest facility. This also allows the vehicle to discharge its load at right angles to the aisle by reason of the fact that the rear end of the truck is capable of swinging movement about a center that is disposed adjacent to one of the front wheels of the truck.

This action can be better considered in connection with Figure 2 in which an intersecting aisle is indicated at 70. The truck in turning about the aisle swings about a center located about the point which is adjacent to and in line with the axis of the front driving wheels 20 of the truck. From this view it will be apparent that the truck can turn about an intersecting aisle which is of smaller width than the over-all length of the truck by a considerable amount. Also, the forward portion of the truck, including the load-carrying means 23, can be turned at right angles to an aisle or passageway by the steering movement produced by the wheels 17 whereby the truck pivots about a point adjacent one of its front wheels, and consequently any load carried upon the means 23 can be discharged at substantially right angles to the aisle or passageway.

The axle 30 is supported from the rear portion of the frame of the vehicle by means of the longitudinally extending leaf springs 74 which are connected at their ends through suitable shackles to the frame of the truck, and intermediate the ends are clamped to the axle member 30 by clamping plates 75 secured over the top of suitable recesses 76 in which the springs seat and secured thereto by means of bolts 77. Thus the springs are rigidly secured to the axle 30 to support the same, and are pivotally connected at their ends to the truck frame whereby the weight of the truck is resiliently supported upon the axle 30 and the wheels to provide for the desired riding characteristics for the operator standing upon the platform 15, and also to insure sufficient frictional engagement of the wheel 17 to effect turning movement of the vehicle.

It will therefore be apparent that I have provided a novel type of steering mechanism for trucks of this type, which is simple in construction, produces the desired differential turning action of the steering wheels, and which in no way interferes with other portions of the vehicle.

I am aware that various changes may be made in certain details of construction of the present invention, and I therefore do not intend to be limited except as defined by the scope and spirit of the appended claims.

I claim:

1. An industrial truck including a frame having an upwardly arched rear portion, a transverse dead axle beneath said arched portion, longitudinally directed spring means between said frame and said axle, dirigibly mounted wheels at the end of said axle, a vertical pivot journalled centrally in said axle, steering means connected to the lower end thereof for rotating said pivot, a crank plate keyed to the upper end of said pivot above said axle and spring means, and crank arms pivotally connected to the wheels and having their adjacent ends connected in overlapping relation to the crank plate whereby rotation of the plate produces a differential steering movement upon the wheels.

2. In combination, an axle having king pins at opposite ends thereof, steering spindles rotatably mounted on said king pins, a vertical pin rotatably supported intermediate the ends of said axle, a crank keyed to one end of said pin above said axle, motion transmitting connections from each spindle to said plate having overlapping engagement on said plate, a crank arm at the lower end of said pin and means extending through said axle and engaging the end of said arm for rotating said plate to impart differential steering movement to said spindles.

3. An axle construction for a lift truck comprising an axle extending transversely therebeneath, spaced pockets formed in said axle, leaf spring means clamped at their center in said pockets and secured at their ends to the truck frame, vertical journals in said axle intermediate said pockets and at each end thereof, a shaft mounted in said intermediate journal, king pins in said end journals, wheel spindles rotatable on said king pins and having steering knuckles, a crank keyed to the upper end of said shaft above said clamp portions of said upper spring means, links having overlapping adjacent ends secured to said crank and connected at their opposite ends to said knuckles, a crank arm keyed to the lower end of said shaft, and means engaging said arm for rotating said shaft.

4. In an industrial truck, a transverse dead axle having dirigibly mounted steering wheels at the ends thereof, leaf springs extending normal to said axle in laterally spaced relation, spaced recesses in the upper face of said axle receiving the center portions of said springs, a journal in the axle intermediate said recesses, a vertical shaft mounted in said journal with its upper end projecting above said center portions of said springs, a crank plate secured to said end of said shaft and having laterally spaced pivot portions, tie rods connected to each wheel and secured in overlapping relation to said pivots, a vertical steering shaft carried by said truck remote from said axle, a crank arm on the lower end of said first-named shaft, and a motion transmitting rod connected between said steering shaft and said crank arm and extending beneath said springs and through the lower portion of said axle.

ELMER J. DUNHAM.